US008681929B2

(12) United States Patent
Evans et al.

(10) Patent No.: US 8,681,929 B2
(45) Date of Patent: Mar. 25, 2014

(54) NUCLEAR REACTOR FUEL ASSEMBLY

(75) Inventors: Paul M. Evans, Chapin, SC (US);
Harry A. Pearce, Lexington, SC (US);
Michael A. Marzean, Columbia, SC (US); David A. Boatwright, Lexington, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1727 days.

(21) Appl. No.: 12/014,133

(22) Filed: Jan. 15, 2008

(65) Prior Publication Data

US 2014/0029713 A1    Jan. 30, 2014

(51) Int. Cl.
*G21C 3/34* (2006.01)
(52) U.S. Cl.
USPC ........... 376/442; 376/409; 376/426; 376/434; 376/438
(58) Field of Classification Search
USPC .......................... 376/449, 444, 438, 412, 434
See application file for complete search history.

(56) References Cited

U.S. PATENT DOCUMENTS

| | | | | |
|---|---|---|---|---|
| 3,791,466 | A | * | 2/1974 | Patterson et al. ............. 376/442 |
| 3,920,516 | A | * | 11/1975 | Kmonk et al. ................ 376/441 |
| 4,053,080 | A | * | 10/1977 | Daublebsky .................. 220/586 |
| 4,081,324 | A | * | 3/1978 | Flora et al. .................... 376/441 |
| 4,124,443 | A | * | 11/1978 | Bezold ........................... 376/434 |
| 4,135,972 | A | * | 1/1979 | Anthony et al. .............. 376/442 |
| 5,263,072 | A | * | 11/1993 | Canat et al. ................... 376/439 |
| 5,966,419 | A | * | 10/1999 | Petit .............................. 376/441 |
| 7,149,273 | B2 | * | 12/2006 | Evans et al. ................... 376/438 |
| 7,511,244 | B2 | * | 3/2009 | Stieglbauer et al. ......... 219/91.2 |

OTHER PUBLICATIONS

Merriam-Webster's Collegiate Dictionary, tenth Edition, 1993, p. 1113.*
Merriam-Webster's Collegiate Dictionary, tenth edition, 1939, p. 332.*

* cited by examiner

*Primary Examiner* — Jack W Keith
*Assistant Examiner* — Marshall O'Connor
(74) *Attorney, Agent, or Firm* — Joseph C. Spadacene; Westinghouse Electric Company LLC

(57) ABSTRACT

A fuel assembly for a nuclear reactor that employs dissimilar materials for the fuel assembly grid and the control rod guide thimbles. The guide thimbles are secured to the grid employing a through grid cell sleeve that is welded to the grid and spot weld rings that are secured over the sleeve and welded directly to the guide tube through windows in the sleeve.

16 Claims, 7 Drawing Sheets

NUCLEAR REACTOR FUEL ASSEMBLY

CROSS-REFERENCE TO RELATED APPLICATIONS

This application is related to U.S. patent application Ser. No. 11/764,540 filed Jun. 16, 2007 and assigned to the assignee of this invention.

BACKGROUND OF THE INVENTION

1. Field of the Invention

The present invention relates generally to nuclear reactor fuel assemblies and, more particularly, is concerned with the connection between the fuel assembly grids and the control rod guide thimbles.

2. Description of Related Art

In a typical nuclear reactor, the reactor core includes a large number of fuel assemblies, each of which is composed of top and bottom nozzles, also referred to as end fittings and a plurality of transverse support grids axially spaced along and attached to the guide thimbles. Also, each fuel assembly is composed of a plurality of elongated fuel elements or rods transversely spaced apart from one another and from the guide thimbles, and supported by the transverse grids between the top and bottom nozzles. The fuel rods each contain fissile material and are grouped together in an array which is organized so as to provide a neutron flux in the core sufficient to support a high rate of nuclear fission, and thus the release of a large amount of energy in form of heat. A liquid coolant is pumped upwardly through the core in order to extract some of the heat generation in the core for the production of useful work. Since the rate of heat generation in the reactor core is proportional to the nuclear fission rate, and this, in turn, is determined by the neutron flux in the core, control of heat generation at reactor start-up, during operation, and at shut down is achieved by varying the neutron flux. Generally this is done by absorbing excess neutrons using control rods which contain neutron absorbing material. The guide thimbles, in addition to being structural elements of the fuel assembly, also provide channels for insertion of the neutron absorber control rods within the reactor core. The level of the neutron flux, and thus the heat output of the core is normally regulated by movement of the control rods into and from the guide thimbles.

The guide thimbles are rigidly connected at each end respectively to the top nozzle and the bottom nozzle and the grids are fixably attached to the guide thimbles at grid cell locations through which the guide thimbles pass. The top nozzle, bottom nozzle, guide thimbles and grids thus form the structural elements of the fuel assembly also known as the fuel assembly skeleton.

The grids are used to precisely maintain the spacing between fuel rods in a nuclear reactor core, prevent rod vibration, and provide lateral support for the fuel rods. Grids are made of materials with low neutron absorption cross-sections such as stainless steel, Inconel, and alloys of Zirconium, such as Zircaloy, to minimize grid deformation, neutron capture, and the loss of structural integrity during irradiation. Conventional designs of grids for nuclear fuel assemblies include a multiplicity of interleaved interior grid straps formed in an egg-crate configuration defining cells which accept the fuel rods and the guide thimbles. The ends of each of the interior grid straps are interlocked with an outer grid strap, forming the peripheral cells of the grid. Each cell through which the fuel rods pass provides support to one fuel rod at a given axial location through the use of relatively resilient springs of various forms. In order to minimize the lateral displacement of fuel rods and to improve the fuel characteristics of an assembly, a number of grids are used along the fuel assembly length. In a pressurized water reactor, typically each grid is held in place along the fuel assembly by its attachment to the control rod guide thimbles.

The interior straps of the grids that are interlocked in an egg-crate pattern are generally held in place by a welded or braised joint at their intersecting locations. The ends of the lattice straps are similarly affixed to the perimeter straps that surround them by welds or braises. If the straps are made of Zircaloy or stainless steel, they can generally be welded. If Inconel or nickel plated Inconel are employed, they generally have to be braised. Various means of attachment are used to position and secure the spacer grid assemblies to the guide thimble tubes. These means of attachment include welding of the grids to the tubes, braising, bulging of the tubes into sleeves that are attached to the grids, and welding split rings 40 to the guide thimbles 18 directly above and below the grid straps 42 as shown in FIG. 1. The latter two mechanical approaches to connecting the guide thimbles to the grid straps are necessary where dissimilar materials are employed for the grid straps and the guide thimbles, e.g., Inconel grids and Zircaloy guide thimbles. With individual split rings 40 used on either side of the grid straps 42, issues can arise due to the size of the gaps between the rings 40 and the grid straps 42, which can result in uneven loading of the rings 40, lack of coplanarity of the rings 40, and difficulties inspecting the ring to grid gaps.

Designers are constantly seeking to improve the means of manufacture of the grids and fuel assembly skeletons. Areas of interest include mechanisms for reducing the manufacturing effort, and meeting the stringent design envelope, or tolerances, on dimensional parameters of the grid. Further considerations include retaining the structural rigidity of the fuel assembly skeleton. More particularly, the need specifically exists for an improved connection between the grid straps and the guide thimbles that will accommodate the use of dissimilar materials for the grid straps and the guide thimbles. While Zircaloy has a lower neutron capture cross section than Inconel, Inconel has a greater stiffness and a lower relaxation rate than Zircaloy and thus is more desirable for use as a grid strap material. U.S. patent application Ser. No. 11/764,540, filed Jun. 18, 2007 and assigned to the assignee of this invention addresses that need by providing a through grid split sleeve that extends from above the grid straps to a distance below the grid straps. The uncompressed diameter of the sleeve is equal to or larger than the diameter of the cell through which the guide thimble extends. Preferably, the sleeve is made of a resilient material that is the same as or weld compatible to that of the guide thimble. The sleeve is compressed and in its compressed condition it is inserted through the corresponding cell of the grid with a portion of the sleeve extending above and below the grid straps. The sleeve is then allowed to expand to its uncompressed condition thereby securing the sleeve within the guide thimble cell. The sleeve may then be welded or otherwise secured to the grid strap. When the sleeve is secured within the cell, the guide thimble can be inserted and welded or otherwise attached at either end of the sleeve or at both ends of the sleeve. While this arrangement provides a secure connection between the grid straps and the guide thimbles when employing dissimilar materials further means are still desired that will enhance the rigidity of the connection.

SUMMARY OF THE INVENTION

This invention achieves an improvement in the manufacture of nuclear fuel assemblies by providing an improved connection between the grid straps surrounding the cells through which the guide thimbles pass and the guide thimbles when dissimilar materials are employed for the guide thimbles and the grid straps. The improvement comprises a through grid sleeve that extends from above the grid straps to a distance below the grid straps of the cells through which the guide thimbles pass. The through grid sleeve has a diameter that is larger than or equal to an axially transverse width of the guide thimble cell and is mechanically or metallurgically affixed to at least one wall of the cell. The guide thimble extends through the sleeve which has a first opening in a wall of the sleeve in a first portion of the sleeve that extends from one end of the cell and a second opening in the wall of the sleeve in a second portion of the sleeve that extends from a second end of the cell. A first weld ring is fit over and circumscribes, at least in part, a circumference of the first portion of the sleeve and is welded directly to the guide thimble through the first opening. A second weld ring is fit over and circumscribes, at least in part, a circumference of the second portion of the sleeve and is welded directly to the guide thimble through the second opening.

Preferably the first and second weld rings have an axial slit that enable them to be easily positioned over the through grid sleeve and snugly fit around the sleeve. In a further embodiment the weld rings have protrusions that extend radially inward in a line with the openings in the weld rings to seat firmly against the guide thimble. Desirably, the through grid sleeve also fits snugly against the guide thimble so that both the weld rings and sleeve maintain their position during assembly for attachment.

In another embodiment the through grid sleeve is provided with one or more windows in an axial central portion of the sleeve with the top ledge and bottom ledge of the window aligned with the top ledge and bottom ledge of the grid straps that surround the sleeve. Preferably the sleeve is firmly attached to the grid straps and the weld rings are welded to the guide thimble providing a rigid joint between the guide thimble and the grid.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
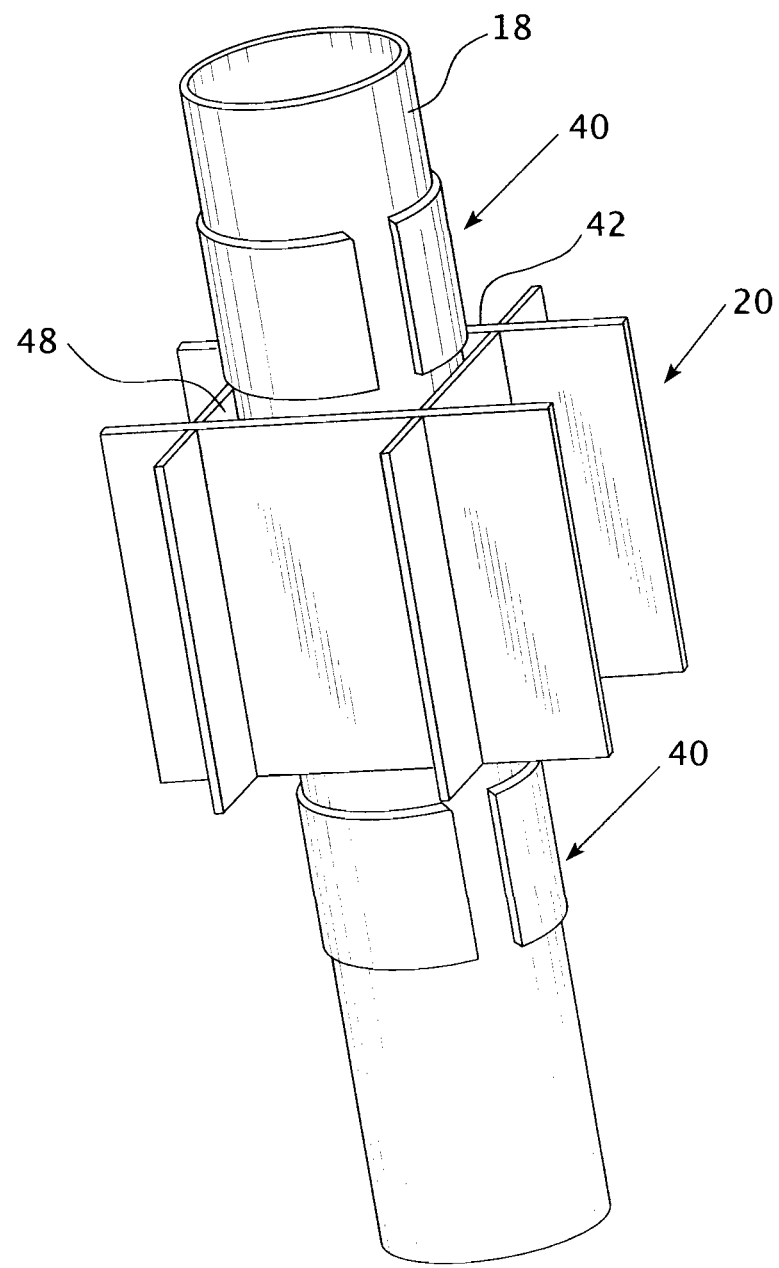
FIG. 1 is a perspective view of a prior art split ring connection of a guide thimble to a fuel grid cell.

For convenience, this invention will be described with reference to a pressurized water reactor, though it should be appreciated that this invention may be used with other reactor designs that employ similar guide tubes within a support cell structure, or any other application requiring the connection of annular sleeves of dissimilar materials requiring a welded connection. Accordingly, reference to a pressurized water reactor is not meant to be limiting upon the scope of the invention.

Directional phrases used herein, such as, for example, upper, lower, top, bottom, left, right, and derivatives thereof for the most part relate to the orientation of the elements shown in the drawings and are not meant to be limiting upon the claims, unless expressly recited therein. As employed herein, the statement that two or more parts are "coupled" together shall mean that the parts are joined together, either directly or joined through one or more intermediate parts. In addition, as employed herein, the term "number" shall refer to one and more than one, i.e., a plurality.

Fuel Assembly

Figure 2:
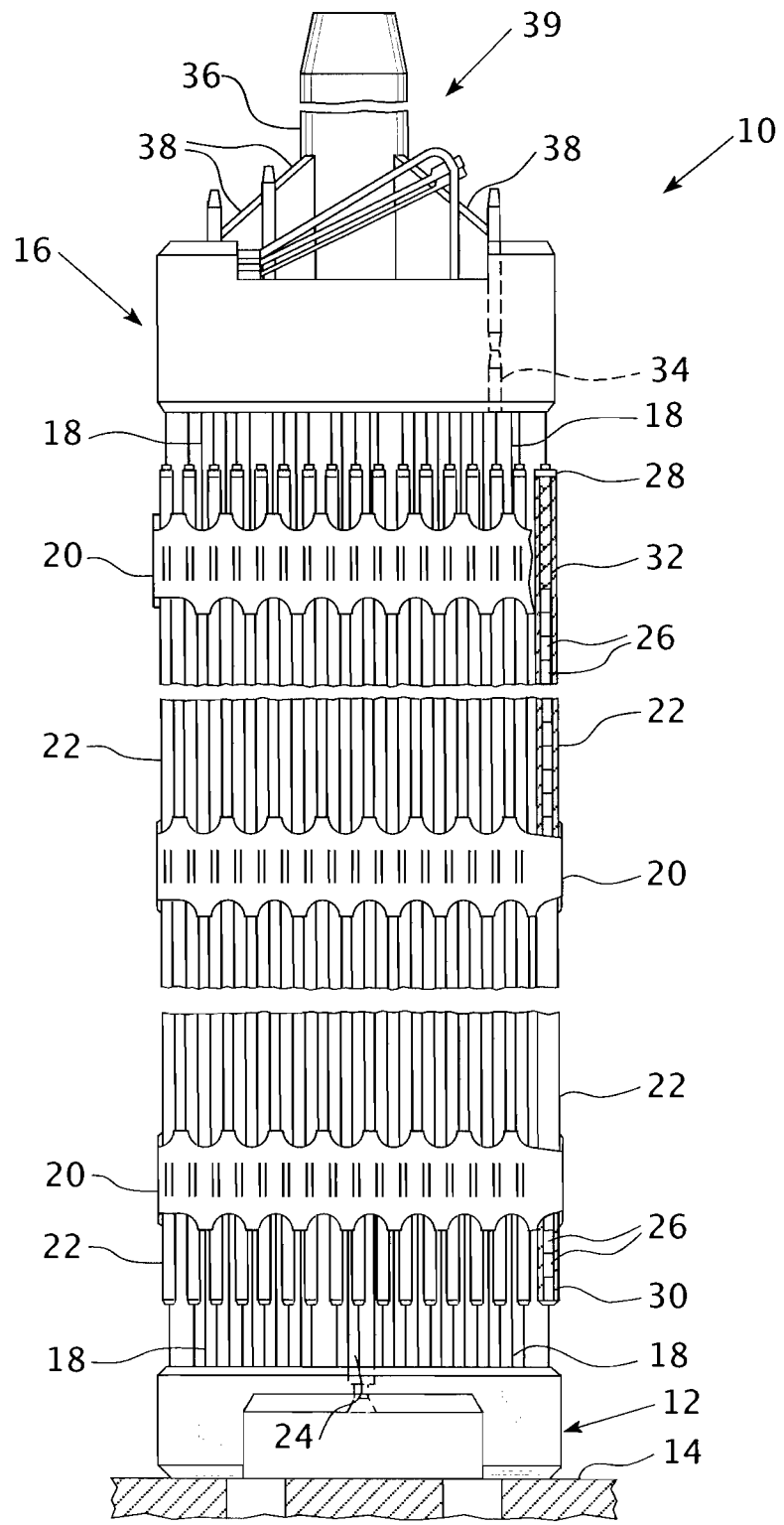
FIG. 2 is an elevational view of the fuel assembly, illustrated in vertically shortened form, and a control assembly therefore, partially shown in hidden line drawing.

Referring now to the drawings, and particularly to FIG. 2, there is shown an elevational view of a nuclear reactor fuel assembly, represented in vertically shortened form and being generally designated by reference character 10. The fuel assembly 10 is the type used in a pressurized water reactor and has a structural skeleton which, at its lower end, includes a nozzle 12 for supporting the fuel assembly 10 on a lower core support plate 14 in the core region of the nuclear reactor (not shown), a top nozzle 16 at its upper end, and a number of guide tubes or thimbles 18 which extend longitudinally between and are rigidly coupled at opposite ends to the bottom and top nozzles 12 and 16.

The fuel assembly 10 further includes a plurality of transverse grids 20 axially spaced along and mounted to the guide thimble tubes 18 and an organized array of elongated fuel rods 22 transversely spaced and supported by the grids 20. The assembly 10 also has an instrumentation tube 24 located in the center thereof and extending between and mounted to the bottom and top nozzles 12 and 16. In view of the foregoing arrangement of parts, it should be understood that the fuel assembly 10 forms an integral unit capable of being conveniently handled without damaging the assembly of parts.

As previously discussed, the array of fuel rods 22 in the fuel assembly 10 is held in a spaced relationship with one another by the grids 20 which are spaced along the fuel assembly length. Each fuel rod 22 includes nuclear fuel pellets 26 and is closed at its opposite ends by upper and lower end plugs 28 and 30. The pellets 26 are maintained in a stack by a plenum spring 32 disposed between the upper end plug 28 and the top of the pellet stack. The pellets 26, composed of fissile material, are responsible for creating the reactive power of the reactor. A liquid moderator/coolant such as water, or water containing boron, is pumped upwardly through a plurality of flow openings in the lower core plate 14 to the fuel assembly. The bottom nozzle 12 of the fuel assembly 10 passes the coolant upwardly through the guide tubes 18 and along the fuel rods 22 of the assembly, in order to extract heat generated therein for the production of useful work. To control the fissile process, a number of control rods 34 are reciprocally movable in the guide tubes 18 located at pre-determined positions in the fuel assembly 10. A spider assembly 39 positioned above the top nozzle 16 supports the control rods 34 which extend downward from flukes 38 which radially extend from a central hub 36.

Figure 3:
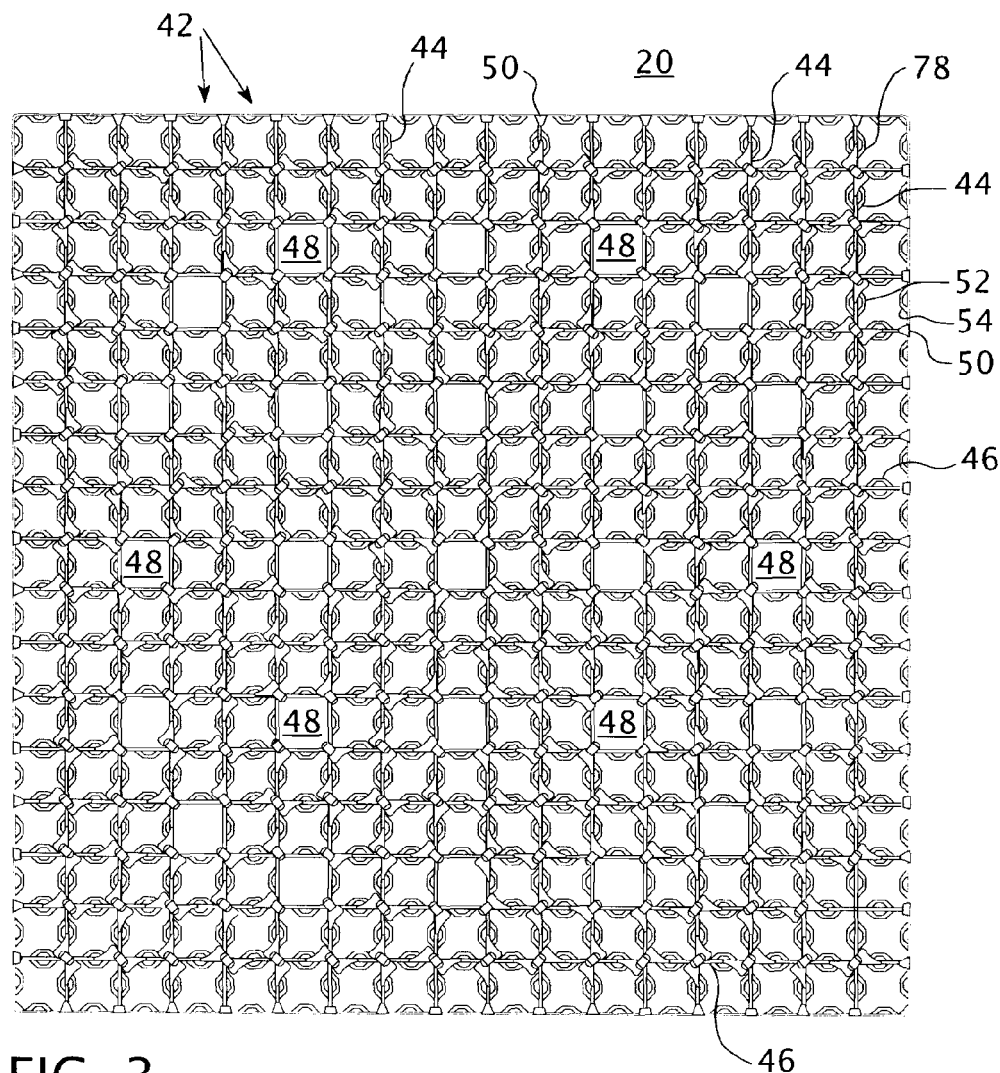
FIG. 3 is a plan view of the grid support assembly of this invention showing the general grid pattern confined within a perimeter strap.

FIG. 3 illustrates a 17 by 17 array of cells, though it should be appreciated that the application of the principles of this invention are not affected by the number of fuel rods 22 in the fuel assembly 10. The lattice straps which form the orthogonal members 44 and 46 shown in FIG. 3, are substantially identical in design. While the lattice straps 44 and 46 are substantially identical, it should be appreciated that the design of some of the lattice straps 44 will vary from other lattice straps 44 as well as some of the straps 46 vary from other straps 46, to accommodate the guide thimbles 18, as can be better appreciated by reference to FIG. 3, which shows the location of the thimble cells 48 that accommodate the thimble tubes 18.

As previously mentioned, the interior lattice work of conventional designs of grids 20 for nuclear reactor fuel assemblies 10 include a multiplicity of interleaved, inner straps 44 and 46 forming an egg-crate configuration defining cells which accept fuel rods 22. The interleaved design is enabled by vertically cut opposing slots in the inner straps 44 and 46 at intersecting locations, which interlock to form the egg crate configuration, as is commonly known in the art. The ends of each of the inner grid straps 44 and 46 are connected to an outer grid strap 50 to form the peripheral cells of the grid 20. Most of the individual cells of the grid 20 provide support for one fuel rod 22 at a given axial location through the use of the combination of relatively resilient springs 52 and dimples 54 of various forms. The outer grid strap 50 encloses the inner grid straps 44 and 46 to impart strength and rigidity to the grid 20. The cells 48 through which the guide thimbles extend can be identified in FIG. 3 as the cells without dimples or springs.

As previously stated the control rod guide thimbles are preferably fixedly attached to the grids 20 and upper and lower nozzles or end fittings 16 and 12 to form a rigid fuel assembly skeleton. The means of attachment between the guide thimbles 18 and the grids 20 employed in the past include welding of the grids 20 directly to the guide thimbles 18, bulging of the guide thimbles 18 into sleeves that are attached to the grids 20, and welding split sleeves to the guide thimbles 18 directly above and below the grid straps as shown in FIG. 1. This last approach has been employed in various designs that incorporate Inconel grids and Zirconium guide tubes because welding of such dissimilar materials is problematic. However, the use of split sleeves above and below the grid does not provide a rigid joint between the guide thimbles and the grid. Additionally, the split rings above and below the grid, also have their drawback in that the gaps between the sleeves and the grid straps can result in uneven loading of the sleeves, lack of coplanarity of the sleeves and make inspection of the sleeve to grid gaps difficult. Furthermore, bulging of the guide tubes into sleeves that are attached to the grids does not create a joint as rigid and desirable as a welded joint.

Figure 4:
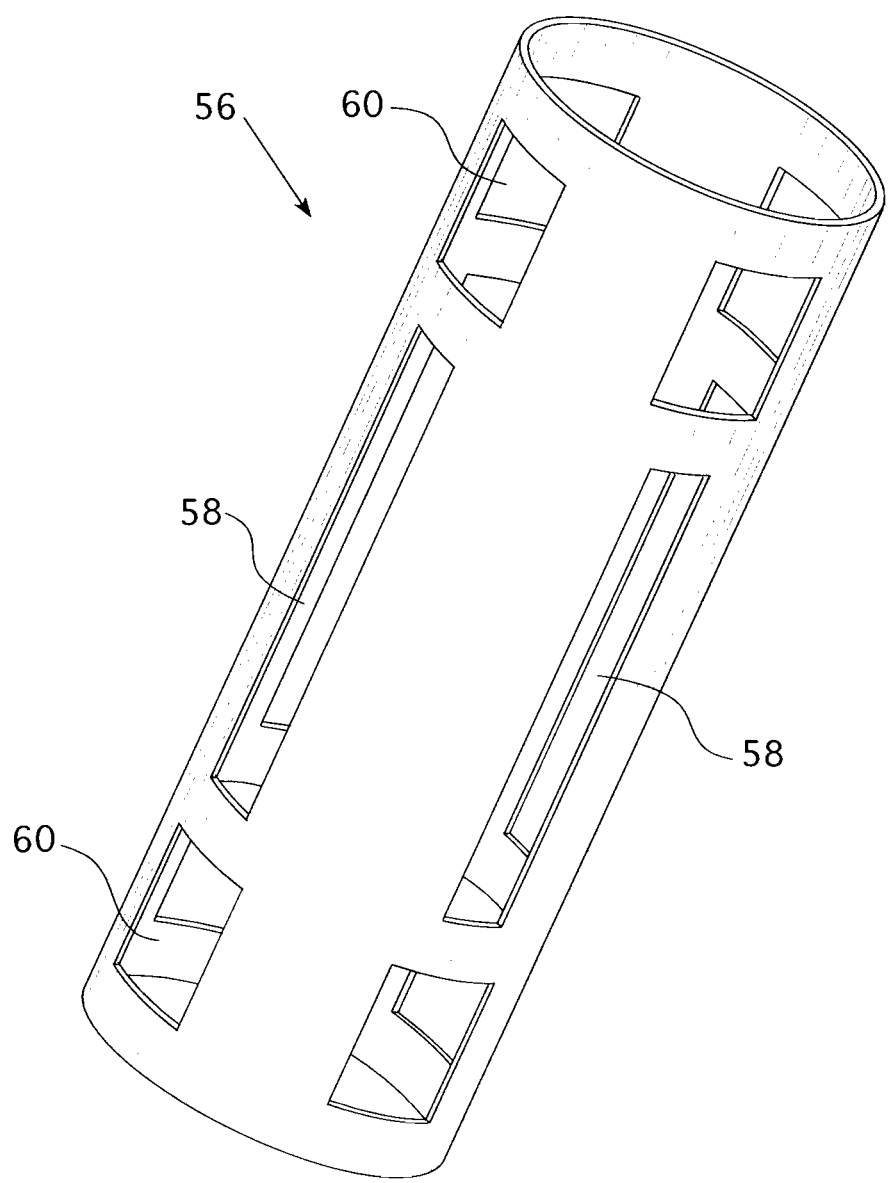
FIG. 4 is a perspective view of the through grid sleeve of this invention.

In accordance with this invention, the control rod guide thimbles 18 are attached to the grid straps 44 and 46 surrounding the cells 48 employing a through grid sleeve 56 and spot weld ring joint. The assembled joint is illustrated in FIG. 7 with the component parts more clearly shown in FIGS. 4, 5 and 6.

The preferred embodiment of the spot weld ring joint 66 employs a stainless steel sleeve 56 (FIG. 4), which is typically brazed to the Inconel grid using a number of windows 58 that extends longitudinally a distance above and below the axial center of the sleeve 56 preferably a length equal to the width of the grid straps 44 and 46. In this embodiment four such windows 58 are shown equally, circumferentially spaced around the sleeve 56; one for each wall of the cell 48. The sleeve has a number of additional windows 60 above and below the windows 58. Eight additional rectangular windows 60, four above and four below the windows 58 are shown in the embodiment illustrated in FIG. 4. The windows 60 are used to interface with a spot weld ring 64 illustrated in FIG. 6.

Figure 5:
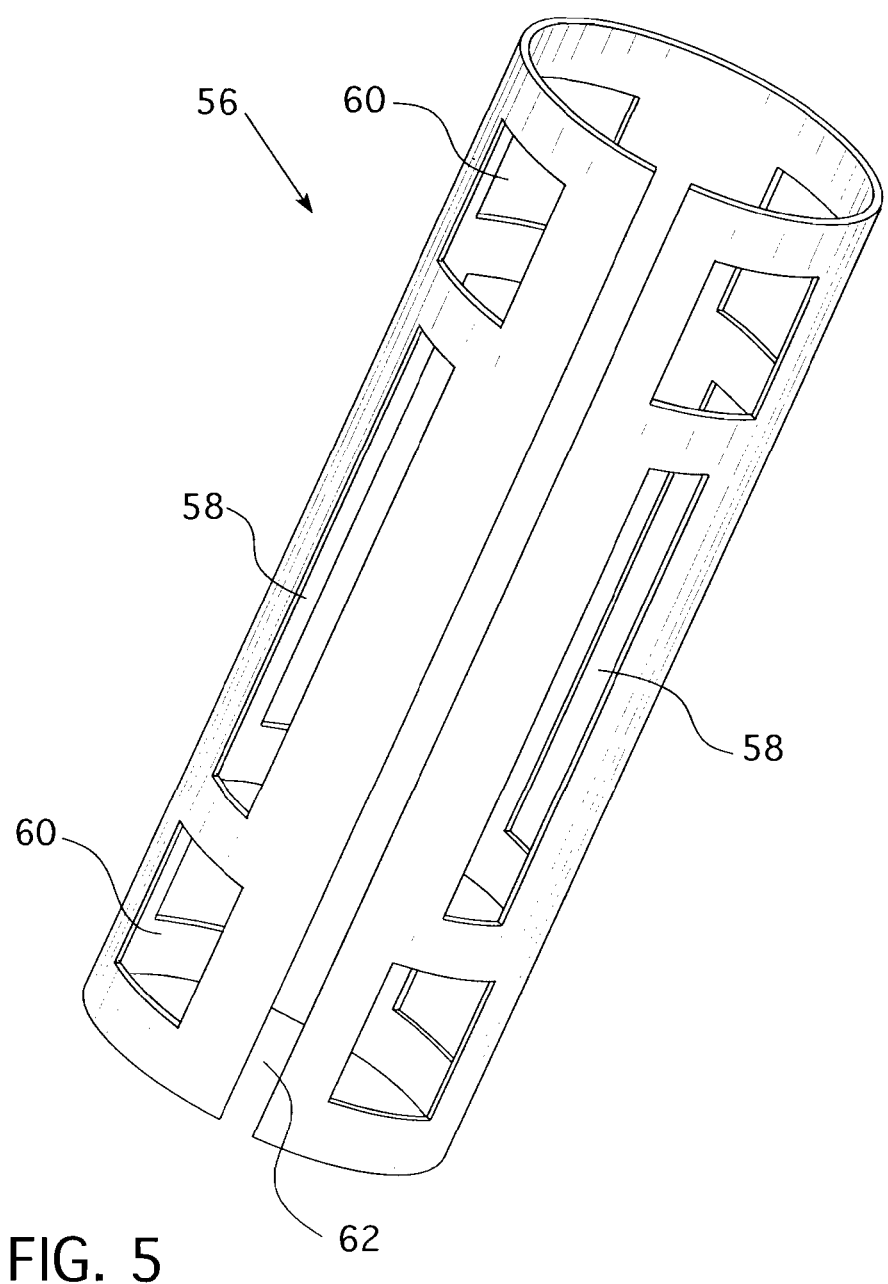
FIG. 5 is a perspective view of an alternative sleeve to that shown in FIG. 4.
Figure 6:
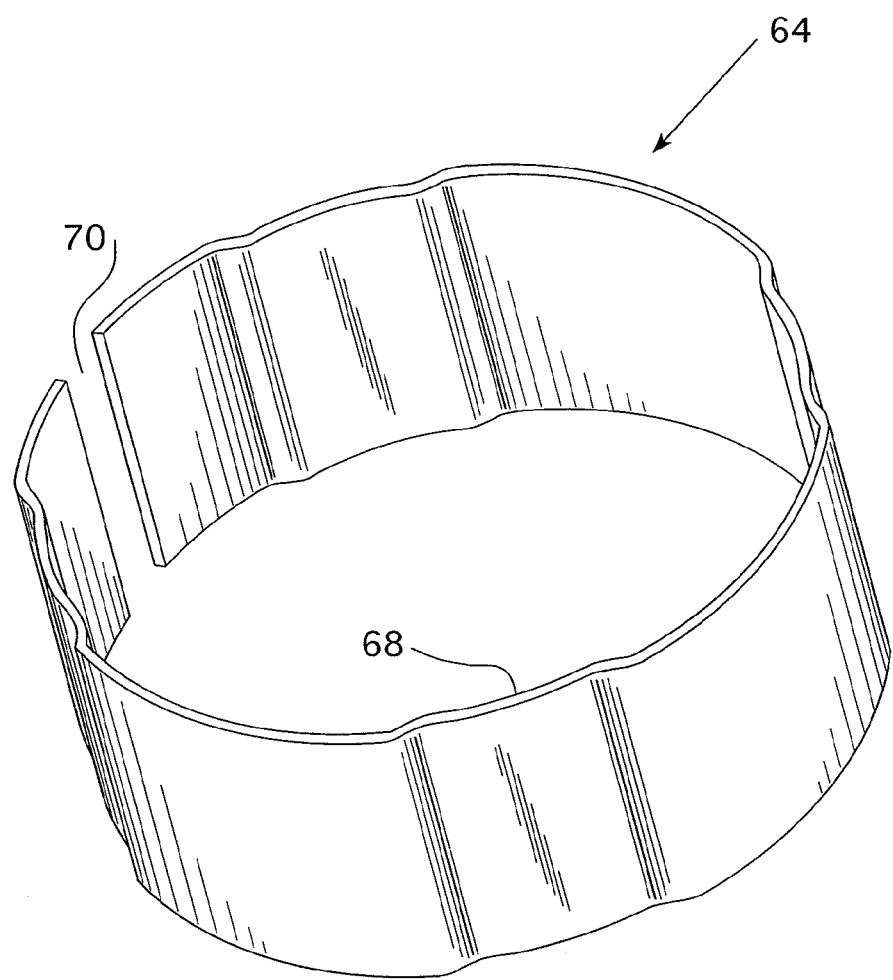
FIG. 6 is a perspective view of a weld ring of this invention.
Figure 7:
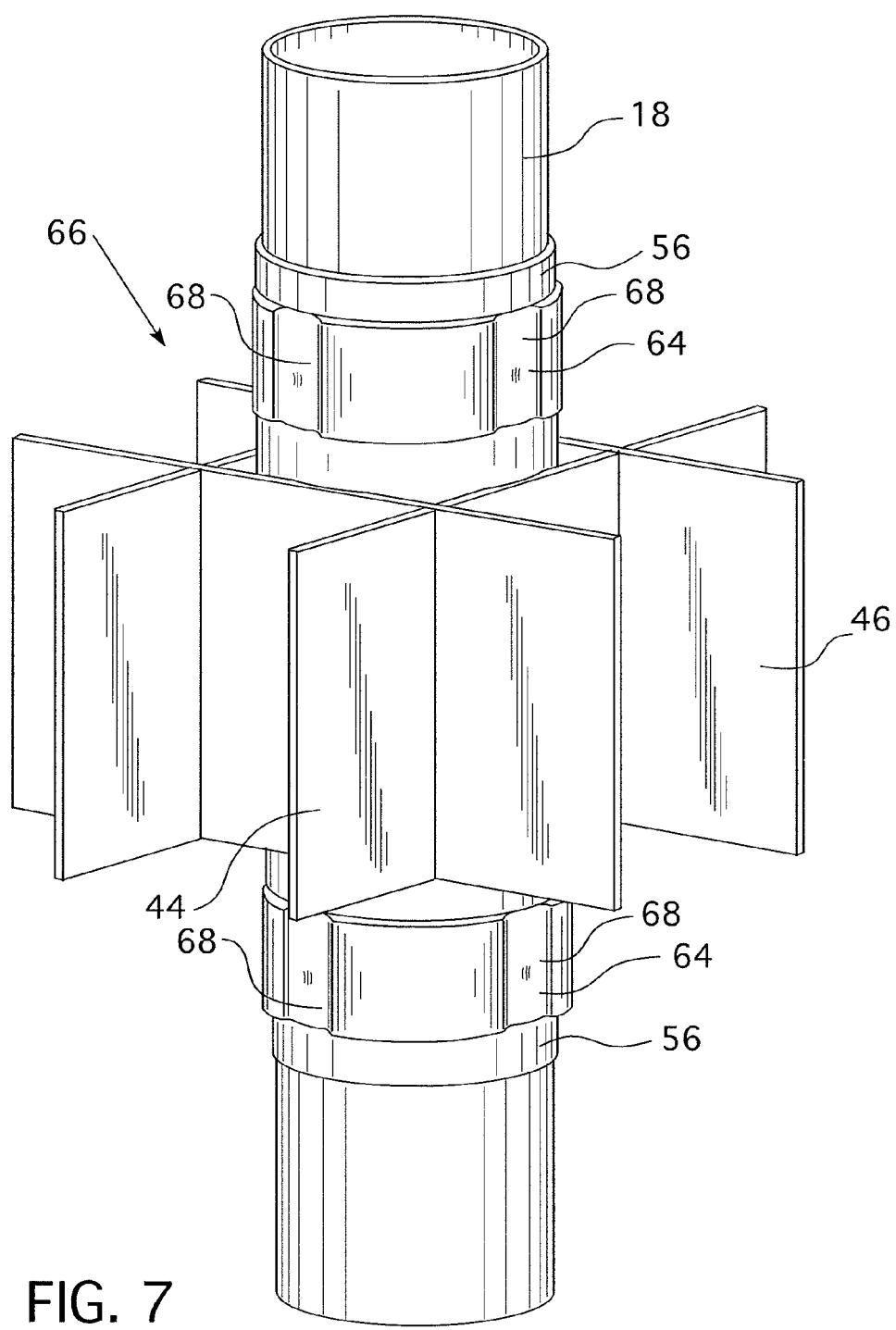
FIG. 7 is a perspective view of the assembled joint of this invention.

The spot weld ring 64 is preferably made of a Zirconium alloy material and in one preferred embodiment illustrated in FIG. 6 is formed such that radially inward protruding sections 68 (formed for example by stamping) will fit snugly inside of the windows 60 in the sleeve 56 and the outside of the sleeve 56 will be in tight contact with the inside of the spot weld ring 64. The ring 64 has a slot 70 which provides some flexibility for the part to be expanded while assembling onto the stainless steel sleeve 56. To aid fuel assembly skeleton manufacturing, the ring 64 would typically be manufactured such that the installed ring would fit tightly around the sleeve 56 prior to resistance welding to the guide tube at the radially inwardly protruding sections 68, rather than being a loose fit that would have to be mechanically clamped prior to welding. Similarly, the sleeve 56 can be provided with a longitudinal slot 62, as shown in FIG. 5 so that its diameter can be slightly reduced by compression while being inserted into the cell 48 where it can be expanded to fit firmly within the cell with the upper and lower ledges of the windows 58 resting upon the edges of the straps 44 and 46. After the ring 64 is installed, the ring is resistance welded at the eight window locations directly to the thimble tube 18. The completed joint assembly is illustrated in FIG. 7 and provides lateral as well as axial support of the Inconel spacer grid.

From a design perspective, the joint 66 provides a more rigid connection than the separate split sleeves illustrated in FIG. 1. This is of particular importance when the design of this invention is employed on a grid located in a location other than the top grid, since the rigidity of the connection between the grid and thimble tube affects the lateral stiffness of the skeleton. Lateral stiffness of the skeleton assembly is of particular importance for seismic/LOCA (Loss Of Coolant Accident) considerations as well as for maintaining a straight assembly for control rod insertion. Additionally, the joint provides more axial support than the separate split sleeves since both the top and bottom spot weld rings will act to resist the axial movement of the grid, whereas only one of the sleeves acted to resist axial movement in the separate split sleeve design. The length of the window and the height of the spot weld ring can be set such that there is minimal gap between the parts. From a manufacturing perspective, the joint design 66 is automatically positioned axially in the assembly since the sleeves are rigidly attached to the grid. With the current split sleeve design, each sleeve must be positioned individually. Fabrication experience has shown that maintaining a proper gap between the grid and sleeve is problematic for the separate split sleeve design. From a product assurance perspective, the design of this invention requires fewer inspections since the gap between the sleeve and spot weld rings is set by the design of the parts and is not susceptible to process variations.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only, without limiting the scope of the invention, which is to be given the full breadth of the appended claims and any and all equivalents thereof.

What is claimed is:

1. A fuel assembly for a nuclear reactor comprising:
   a top end fitting;
   a bottom end fitting;
   a plurality of elongated guide thimbles respectively extending in an axial direction between and connected at opposite ends to the top end fitting and the bottom end fitting; and a plurality of transverse grids arranged in a spaced tandem array between the top end fitting and the bottom end fitting, at least some of said grids formed from a plurality of orthogonal intersecting straps that define cells at the intersection of each four adjacent straps, the guide thimbles respectively extending through and fixedly connected to at least some of said cells, the connection between at least some of said guide thimbles and at least some of the corresponding cells through which the guide thimbles pass comprising;

an elongated tubular sleeve having a length in the axial direction longer than a width in the axial direction of the grid straps of the cell through which the corresponding guide thimble passes and having a diameter that is larger than or substantially equal to an axially transverse width of the cell through which the corresponding guide thimble passes, the elongated tubular sleeve having an axial slit that extends the length of the sleeve and the sleeve extending through and above and below the cell through which the corresponding guide thimble passes and being mechanically or metallurgically affixed to at least a one wall of the cell through which the corresponding guide thimble passes, the guide thimble extending through the corresponding sleeve, the tubular sleeve having a first opening in a wall of the sleeve in a first portion of the sleeve that extends from one end of the cell; and a first weld ring fitting over and circumscribing, at least in part, a circumference of the first portion of the sleeve, and extending over more than 180° of the circumference of the first portion of the sleeve and welded to the guide thimble through the first opening.

2. The fuel assembly of claim 1 wherein the tubular sleeve has a second opening in the wall of the sleeve in a second portion of the sleeve that extends from a second end of the cell, the fuel assembly further comprising a second weld ring fit over and circumscribing, at least in part, a circumference of the second portion of the sleeve and welded to the guide thimble through the second opening.

3. The fuel assembly of claim 1 wherein a window is formed in an axial central portion of the sleeve, the window having a top ledge and a bottom ledge, the spacing between the top ledge and the bottom ledge being substantially equal to the axial width of the grid straps that surround the sleeve when the sleeve is inserted into the cell.

4. The fuel assembly of claim 3 wherein the top ledge rests at least partially on the upper edge of the grid straps that surround the sleeve.

5. The fuel assembly of claim 4 wherein the bottom ledge rests at least partially against a lower edge of the grid straps that surround the sleeve.

6. The fuel assembly of claim 3 wherein the window is stamped in a wall of the sleeve.

7. The fuel assembly of claim 1 wherein the sleeve is constructed from a resilient material.

8. The fuel assembly of claim 1 wherein the sleeve is welded or brazed to the grid strap.

9. The fuel assembly of claim 1 wherein the guide thimble and the first weld ring is constructed from Zirconium or a Zirconium alloy and the sleeve is constructed from stainless steel.

10. The fuel assembly of claim 9 wherein the grid straps are constructed from Inconel.

11. The fuel assembly of claim 1 wherein the first weld ring has an axial slit.

12. The fuel assembly of claim 1 wherein the first weld ring has a discrete protrusion that extends radially inwardly and seats in the first opening in the sleeve.

13. The fuel assembly of claim 12 wherein the protrusion on the first weld ring is welded to the guide thimble.

14. The fuel assembly of claim 13 wherein the protrusion on the first weld ring is stamped into the first weld ring.

15. The fuel assembly of claim 12 wherein the first opening comprises a plurality of first openings circumferentially spaced around the first portion of the sleeve and the protrusion on the first weld ring comprises a plurality of protrusions circumferentially spaced around the first weld ring to correspond with the first openings.

16. The fuel assembly of claim 1 wherein the first weld ring is tightly fit around the first portion of the sleeve.

* * * * *